United States Patent
Solihin (10) Patent No.: US 9,710,303 B2
(45) Date of Patent: Jul. 18, 2017

(54) SHARED CACHE DATA MOVEMENT IN THREAD MIGRATION

(71) Applicant: EMPIRE TECHNOLOGY DEVELOPMENT, LLC, Wilmington, DE (US)

(72) Inventor: Yan Solihin, Raleigh, NC (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 712 days.

(21) Appl. No.: 14/009,750

(22) PCT Filed: Jun. 6, 2013

(86) PCT No.: PCT/US2013/044526
§ 371 (c)(1),
(2) Date: Oct. 3, 2013

(87) PCT Pub. No.: WO2014/196976
PCT Pub. Date: Dec. 11, 2014

(65) Prior Publication Data
US 2014/0366030 A1  Dec. 11, 2014

(51) Int. Cl.
*G06F 9/46* (2006.01)
*G06F 9/48* (2006.01)
(Continued)

(52) U.S. Cl.
CPC .......... *G06F 9/4856* (2013.01); *G06F 12/084* (2013.01); *G06F 12/0842* (2013.01);
(Continued)

(58) Field of Classification Search
None
See application file for complete search history.

(56) References Cited

U.S. PATENT DOCUMENTS 6,594,711 B1 * 7/2003 Anderson ........... G06F 12/0802
710/22
8,904,154 B2 * 12/2014 Devadas ...................... 712/225
(Continued)

FOREIGN PATENT DOCUMENTS

WO  2012091702 A1  7/2013
WO  2014014452 A1  1/2014

OTHER PUBLICATIONS

Pedro Chaparro, Jose Gonzalez, and Antonio Gonzalez. Thermal-aware clustered microarchitectures. In IEEE International Conference on Computer Design, Oct. 2004, pp. 48-53.
(Continued)

*Primary Examiner* — Wissam Rashid
(74) *Attorney, Agent, or Firm* — Moritt Hock & Hamroff; Steven S. Rubin, Esq.

(57) ABSTRACT

Technologies are generally described for methods, systems, and processors effective to migrate a thread. The thread may be migrated from the first core to the second core. The first and the second core may be configured in communication with a first cache. The first core may generate a request for a first data block from the first cache. In response to a cache miss in the first cache for the first data block, the first core may generate a request for the first data block from a memory. The first core may coordinate with a second cache to store the first data block in the second cache. The thread may be migrated from the second core to a third core. The second core and third core may be configured in communication with the second cache.

20 Claims, 7 Drawing Sheets

(51) Int. Cl.
G06F 12/084 (2016.01)
G06F 12/0842 (2016.01)

(52) U.S. Cl.
CPC ......... Y02B 60/1225 (2013.01); Y02B 60/144 (2013.01); Y02B 60/162 (2013.01)

(56) References Cited

U.S. PATENT DOCUMENTS

| | | | | |
|---|---|---|---|---|
| 2004/0128452 | A1* | 7/2004 | Schmisseur | G06F 12/0804 711/144 |
| 2005/0240735 | A1* | 10/2005 | Shen | G06F 12/0831 711/144 |
| 2009/0024799 | A1* | 1/2009 | Jahagirdar | G06F 1/3203 711/130 |
| 2009/0165014 | A1* | 6/2009 | Park | G06F 9/5088 718/105 |
| 2012/0173819 | A1 | 7/2012 | Solihin | |
| 2012/0246446 | A1 | 9/2012 | Solihin | |

OTHER PUBLICATIONS

M. Aater Suleman, Onur Mutlu, Moinuddin K. Qureshi, and Yale N. Patt, "Accelerating Critical Section Execution with Asymmetric Multi-Core Architectures", Proceedings of the 14th International Conference on Architectural Support for Programming Languages and Operating Systems (ASPLOS), Washington, DC, Mar. 2009, pp. 253-264.

Mike Powell, Arijit Biswas, Shantanu Gupta, and Shubhendu S. Mukherjee, "Architectural Core Salvaging in a Multi-Core Processor for Hard Error Tolerance," ISCA, Jun. 20-24, 2009, 12 pages.

Tong Li, Paul Brett, Rob Knauerhase, David Koufaty, Dheeraj Reddy, and Scott Hahn, "Operating System Support for Overlapping—ISA Heterogeneous Multi-Core Architectures", International Symposium on High-Performance Computer Architecture, Jan. 2010, p. 1-12.

International Search Report and Written Opinion for PCT application with application No. PCT/US2013/044526, dated Aug. 16, 2013, 13 pages.

Strong, R. et al., "Fast Switching of Threads Between Cores", ACM SIGOPS Operating Systems Review special issue on The Interaction Among the OS, the Compiler, and Multicore Processors, Apr. 2009, p. 1-11, vol. 43, 2.

T. Sondag and H. Rajan, "Phase-Guided Thread to Core Assignment for Improved Utilization of Performance Asymmetric Multi-Core Processors", Proc. of the 2009 ICSE Workshop on Multicore Software Engineering, 2009, 9 pages.

Shekhar Borkar, Andrew A. Chien, "The Future of Microprocessors", Communications of the ACM, vol. 54 No. 5, pp. 67-77, May 2011.

George Patsilaras, Niket K. Choudhar, James Tuck. "Design Trade-offs for Memory Level Parallelism on a Asymmetric Multicore System", PESPMA'10: Third Workshop on Parallel Execution of Sequential Programs on Multi-core Architectures (PESPMA) held in conjunction with ISCA, Jun. 2010, 9 pages.

Teng, Q. et al., "Understanding the Cost of Thread Migration for Multi-Threaded Java Applications Running on a Multicore Platform", IEEE International Symposium on Performance Analysis of Systems and Software, ISPASS, 2009, p. 123-132.

Boyd-Wickizer, S. et al., "A Software Approach to Unifying Multicore Caches", DSpace@MIT: Massachusetts Institute of Technology, 2011, p. 1-13.

Shim, K. S. et al., "Judicious Thread Migration When Accessing Distributed Shared Caches", Proceedings of the Third Workshop on Computer Architecture and Operating System Co-design (COAS), 2012, 9 pages.

Liu, F. et al., "Characterizing and Modeling the Behavior of Context Switch Misses," Proceedings of the 17th international conference on Parallel architectures and compilation techniques, pp. 91-101, 2008.

* cited by examiner

SHARED CACHE DATA MOVEMENT IN THREAD MIGRATION

CROSS-REFERENCE TO RELATED APPLICATIONS APPLICATION

This application is a U.S. National Stage filing under 35 U.S.C. §371 of International Application No. PCT/US13/44526, filed on Jun. 6, 2013. The disclosure of the International Application is hereby incorporated by reference in its entirety.

BACKGROUND

Unless otherwise indicated herein, the materials described in this section are not prior art to the claims in this application and are not admitted to be prior art by inclusion in this section.

In multi-core processor architectures, multiple processor cores may be included in a single integrated circuit die or on multiple integrated circuit dies that are arranged in a single chip package. A cache may be used to store data for access by one or more of the processor cores. The data can be a subset of data stored in a larger memory that is typically located outside of the die. Each core may be provided with a cache that stores data for the core.

SUMMARY

In some examples, systems configured to execute a thread are generally described. The systems may include a first core, a second core, and third core. Each of the cores may be configured to execute the thread. A first cache may be configured in communication with the first core and the second core. The first cache may further be configured to provide storage of data. A second cache may be configured in communication with the second core and the third core. The second cache further may be configured to provide storage of data. The second core may be configured to generate a request for a first data block from the first cache. In response to a cache miss in the first cache for the first data block, the first cache may be further configured to generate a request for the first data block from a memory. The may include including an indicator that the first data block is to be stored in the second cache.

In some examples, methods for migrating a thread in a multi-core processor are generally described. The multi-core processor may include a first core, a second core and a third core. The methods may include generating, by the second core, a request for a first data block from a first cache. The first core and the second core may be configured in communication with the first cache. The methods may include, in response to a cache miss in the first cache for the first data block, generating a request for the first data block from a memory by the first cache. The methods may include receiving, by a second cache, the first data block from the memory. The second core and the third core may be configured in communication with the second cache. The methods may include migrating the thread from the second core to the third core.

In some examples, processors configured to execute a thread are generally described. The processors may include a first core. The first core may include a first, second and third cache. The first core may be configured to execute the thread. The second cache may be configured in communication with the first core. The third cache may be configured in communication with the first core. The first cache may include a table that includes an indication of a data block and an indication of a successor cache associated with the data block. The first core may be configured to write to the data block in the first cache. The first core may be configured to analyze the first table to determine the successor cache for the data block. The first core may be configured to send an update to the successor cache to write the data block to the successor cache.

In some examples, processors configured to execute a thread are generally described. The processors may include a first core and a second core. The first core may be configured to execute the thread. The first core may include a first cache. A second cache may be configured in communication with the first core. A third cache may be configured in communication with the first core. The second core may be configured to execute the thread. The first cache may include a table that includes an indication of a first data block and an indication of a successor cache associated with the data block. The third cache may be configured to be in communication with the first core and the second core. The third cache may include a second table. The second table may include an indication of a second data block and an indication of a predecessor cache associated with the second data block. The third cache may be configured to receive a request to invalidate the second data block. The third cache may be configured to analyze the second table to determine the predecessor cache for the second data block. The third cache may be configured to send an invalidation message to the predecessor cache to invalidate the second data block.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to shared cache data movement in thread migration.

Briefly stated, technologies are generally described for methods, systems, and processors effective to migrate a thread. The thread may be migrated from the first core to the second core. The first and the second core may be configured in communication with a first cache. The first core may generate a request for a first data block from the first cache. In response to a cache miss in the first cache for the first data block, the first core may generate a request for the first data block from a memory. The first core may coordinate with a second cache to store the first data block in the second cache. The thread may be migrated from the second core to a third core. The second core and third core may be configured in communication with the second cache.

Figure 1:
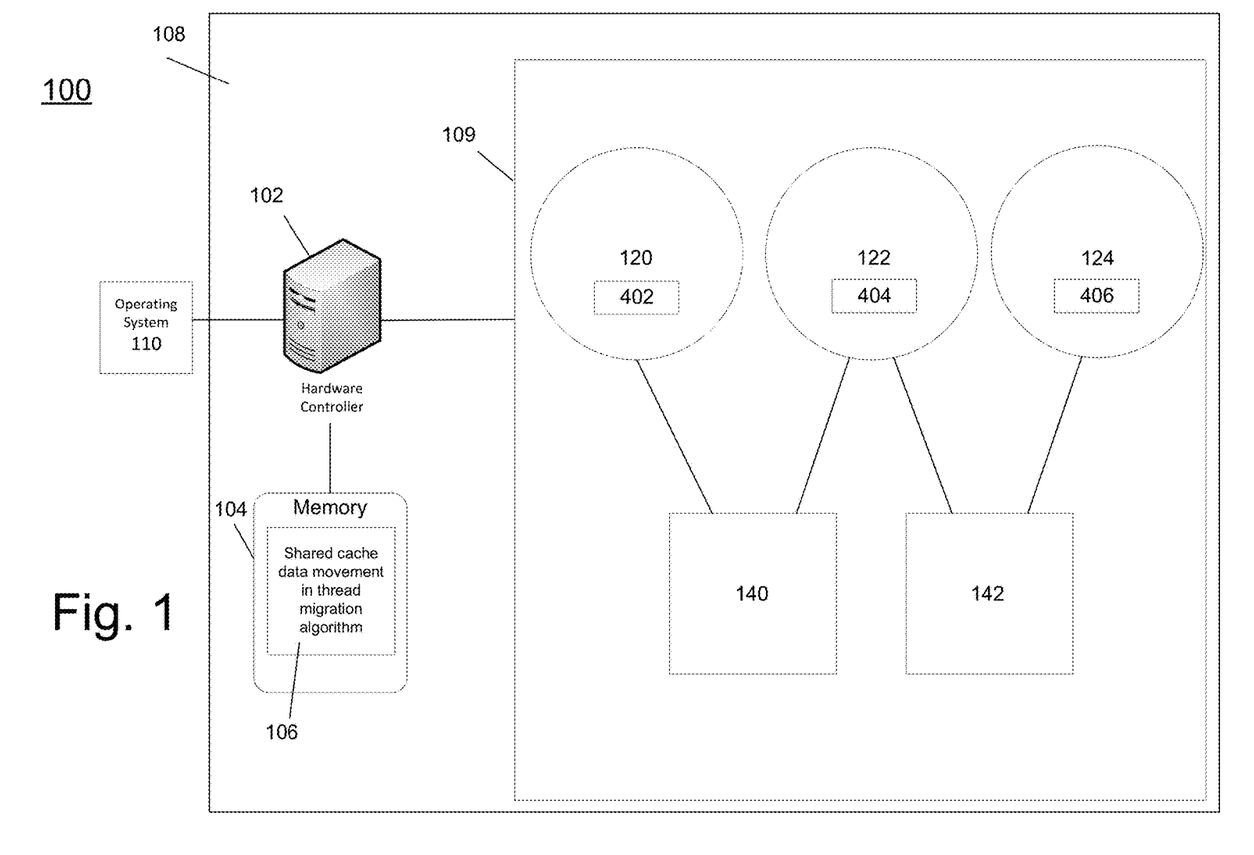
FIG. 1 illustrates an example system that can be used to implement shared cache data movement in thread migration.

FIG. 1 illustrates an example system that can be utilized to implement shared cache data movement in thread migration arranged in accordance with at least some embodiments described herein. An example system 100 may include an operating system 110 and a processor 108. Processor 108 may include a hardware controller 102, a memory 104, and/or a die 109. Die 109 may include two or more cores 120, 122, 124, and/or two or more shared caches 140, 142. Caches 140, 142 may provide storage of data for cores 120, 122, 124. A shared cache data movement in thread migration algorithm 106 (sometimes hereinafter "thread migration algorithm") may be stored in memory 104. Cores 120, 122, and/or 124 may include respective private caches 402, 404, and/or 406. Caches 402, 404, and/or 406 may be higher level caches such as level one (L1) caches.

Operating system 110 may be configured in communication with hardware controller 102. Hardware controller 102 may be configured in communication with processor 108 and/or memory 104. Hardware controller 102 may be configured to access data from memory 104. Thread migration algorithm 106 may be retrieved from memory 104 and may be executed by hardware controller 102.

Each core in processor 108 may be equivalent as in a homogeneous arrangement or some cores may be different as in a heterogeneous arrangement. In a homogeneous arrangement, cores may be capable of executing the instructions from a single instruction set and have substantially similar performance or power consumption. In a heterogeneous arrangement, different cores may be capable of executing the instructions from a single instruction set but have different performance or power consumption, or different cores may be capable of executing the instructions from non-identical instruction sets. In processor 108, caches may be shared by more than one core. For example, cache 140 may be shared by cores 120 and 122. Cache 142 may be shared by cores 122 and 124. Caches 140 and 142 may be lower level caches such as, for example, level 2 (L2) cache or level 3 (L3) cache.

In an example, operating system 110 may schedule threads to be executed by processor 108. When a thread is to be executed, hardware controller 102 may determine which core should execute the thread. In an example, hardware controller 102 may start executing a thread on a first core and then migrate the execution of the thread to a second core. Hardware controller 102 may operate in accordance with thread migration algorithm 106 to handle the thread migration. In an example, hardware controller 102 may migrate a thread from core 120 to core 124. Data stored in cache 140 may be moved from cache 140 to cache 142 on demand by the thread executing on core 124.

Figure 2:
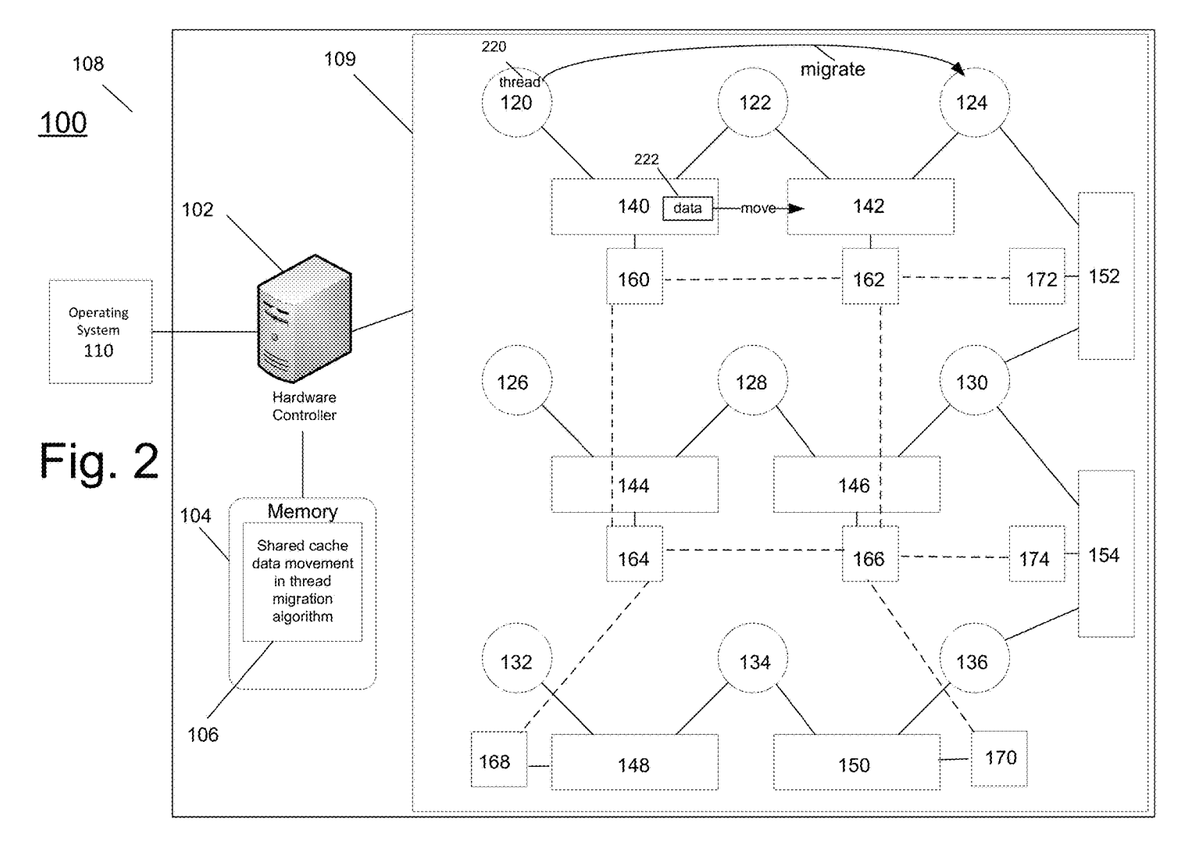
FIG. 2 illustrates an example system that may be used to implement shared cache data movement in thread migration.

FIG. 2 illustrates an example system that can be used to implement shared cache data movement in thread migration arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity and brevity.

In an example, die 109 may further include cores 126, 128, 130, 132, 134 and/or 136, and/or caches 144, 146, 148, 150, 152, and/or 154. Die 109 may further include routers 160, 162, 164, 166, 168, 170, 172, and/or 174 that may be configured in communication as is illustrated by dotted lines. Cache 140 may be configured in communication with router 160. Cache 142 may be configured in communication with router 162. Cache 144 may be configured in communication with router 164. Cache 146 may be configured in communication with router 166. Cache 148 may be configured in communication with router 168. Cache 150 may be configured in communication with router 170. Cache 152 may be configured in communication with router 172. Cache 154 may be configured in communication with router 174. Routers 160, 162, 164, 166, 168, 170, 172, 174 may be interconnected or otherwise coupled to form a network and may each be configured to communicate with other routers over the network. Routers 160, 162, 164, 166, 168, 170, 172, 174 may also be controllers connected to a broadcast medium such as a bus—as illustrated by the dotted lines.

Cache 152 may be configured in communication with processors 124 and 130. Cache 146 may be configured in communication with processors 130 and 128. Cache 144 may be configured in communication with processors 128 and 126. Cache 154 may be configured in communication with processors 130 and 136. Cache 150 may be configured in communication with processors 136 and 134. Cache 148 may be configured in communication with processors 132 and 134.

Data may be moved among caches in die 109. Threads may be migrated among cores in die 109. In an example where a thread 220 is being executed by core 120, data 222 related to thread 220 may be stored in cache 140. When thread 220 is to be migrated from core 120 to core 124, data 222 relating to thread 220 may be moved from cache 140 to cache 142. Moving data 222 from cache 140 to cache 142 allows thread 220 to continue to have relatively fast access to data 222. As described in more detail below, thread migration algorithm 106 may control hardware controller 102 to move data 222 from cache 140 to cache 142 while minimizing a cost in the movement. For example, costs in movement may include lost time and/or expended energy. In some examples, zero additional cost may be realized in moving data 222 from cache 140 to cache 142.

Figure 3:
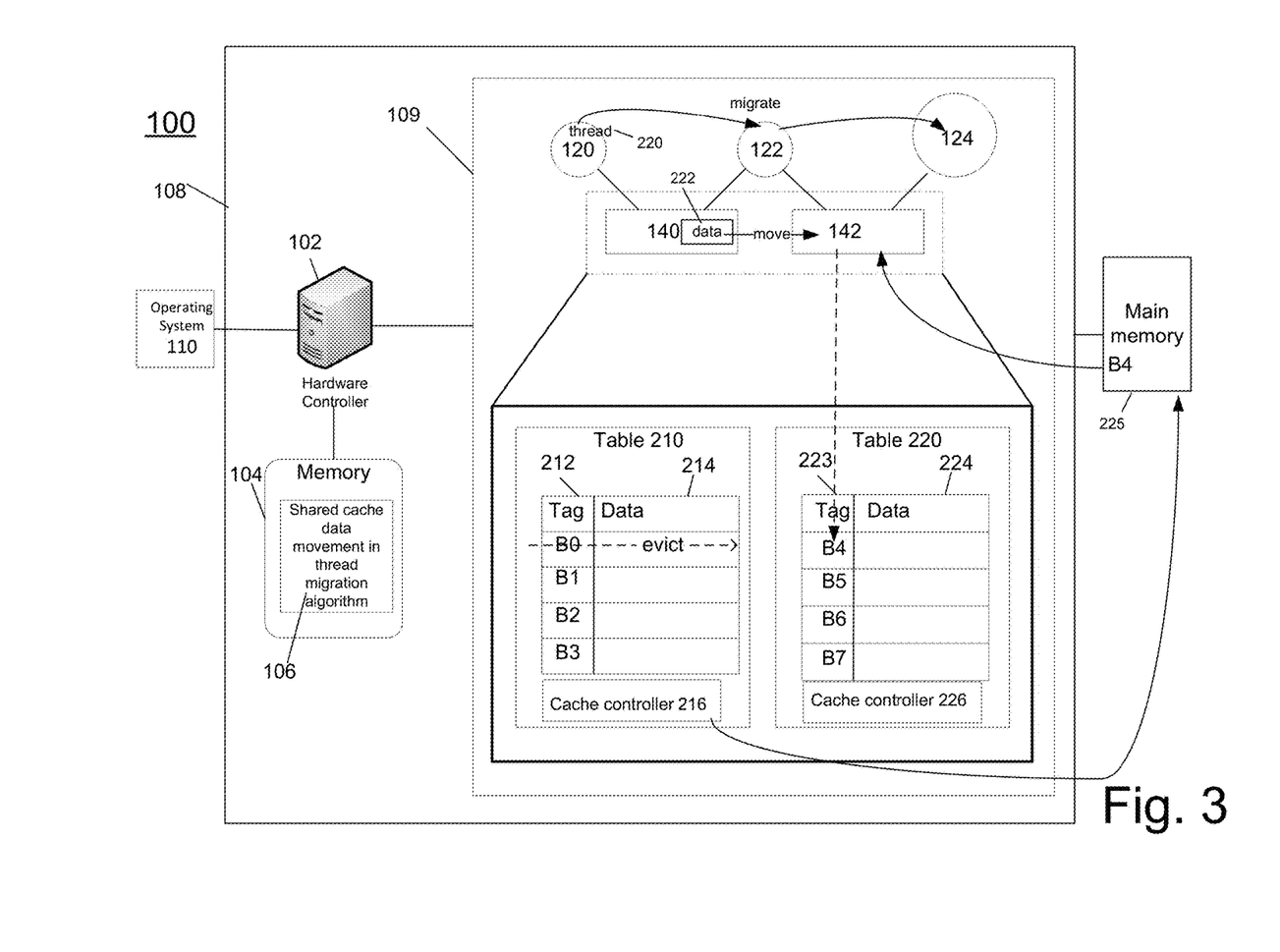
FIG. 3 illustrates an example system that may be used to implement shared cache data movement in thread migration.

FIG. 3 illustrates an example system that can be used to implement shared cache data movement in thread migration arranged in accordance with at least some embodiments described herein. FIG. 3 is substantially similar to system 100 of FIG. 1 and FIG. 2, with additional details. Those components in FIG. 3 that are labeled identically to components of FIG. 1 and FIG. 2 will not be described again for the purposes of clarity and brevity.

The discussion with reference to FIG. 3 will focus on cores 120, 122 and/or 124. Core 124 may have a relatively more powerful processor, such as a processor with a quicker clock speed or capable of exploiting a higher instruction level parallelism, than core 120—as illustrated by the larger circle for core 124. Cache 140 may store information in fields of a table 210 and in a cache controller 216. Cache 142 may store information in fields of a table 220 and in a cache controller 226. Table 210 may include a tag field 212 and/or a data field 214. Table 220 may include a tag field 223 and/or a data field 224. Die 109 may be configured in communication with a main memory 225. Main memory 225 may be located external or internal to processor 108.

In an example, thread 220 may be migrated from core 120 to core 122 or core 124. While executing on core 120, thread 220 may access related data 222 stored in cache 140. In an example, related data 222 may comprise one or more data blocks, such as data blocks "B0", "B1", "B2", and/or data block "B3". Thread 220 may first be migrated from core 120 to core 122 and then from core 122 to core 124. Migration of thread 220 from core 120 to core 122 may result in zero cost in moving data 222 because core 120 and core 122 share cache 140. Core 124 is configured in communication with cache 142 and not cache 140. Data 222 in cache 140 related to the thread 220 may be moved from cache 140 to cache 142.

In examples where hardware controller 102 knows that thread 220 will be migrated to another core, thread migration algorithm 106 may instruct hardware controller 102 to begin to move data 222. For example, an operating system scheduler may define a time quantum for processing a thread on a core. When that quantum is close to running out, hardware controller 102 will know that the thread will soon be migrated. In another example, thermal hot spots on processor 108 may be anticipated by hardware controller 102. For example, hardware controller 102 may determine that some cores in processor 108 may become hot and so may plan a migration of threads from one or more hot cores to other cores. Hardware controller 102 may be able to anticipate when system 100 may become idle thereby suggesting that a thread should be migrated.

As thread 220 is executed by core 122, thread 220 may request data in cache 140. Eventually, thread 220 may experience a cache miss when the requested data is not stored in cache 140. In an example, thread 220 may request access to a data block "B4" from cache 140. As shown in the example of FIG. 3, table 210 of cache 140 includes tags for data blocks B0, B1, B2, and B3. Data block "B4" is not shown in table 210. The absence of data block B4 in table 210 indicates that data block B4 is not stored in cache 140. Consequently, in the example, thread 220 may experience a cache miss for data block B4.

In response to the cache miss, cache controller 216 may send a request for data block B4 to main memory 225. The request may indicate that data block B4 be sent to cache 142. Upon receiving data block B4 from main memory 225, cache controller 226 may update table 220 to reflect that cache 142 now stores data block B4.

In some examples, in response to the cache miss, cache controller 216 may select a data block to evict from cache 140. In the example illustrated in FIG. 3, data block B0 may be evicted—as illustrated by "evict" in table 210. By evicting data block B0, a number of data blocks in cache 140 relating to thread 220 may be reduced by one data block. By storing data block B4 in cache 142, a number of data blocks in cache 142 relating to thread 220 may be increased by one data block. Thread 220 may thus experience little fluctuation in performance as the same total number of data blocks may be available to thread 220.

In an example, when the number of cache misses in cache 140 is equal to the cache capacity of cache 140, data blocks relating to thread 220 may have moved from cache 140 to cache 142. Now data relating to thread 220 may be stored in cache 142 and may be available for use by core 124. At this point, if thread 220 migrates from core 120 or 122 to core 124, thread 220 may find its data blocks in cache 142.

In the example illustrated in FIG. 3, the cache capacity for caches 140 and 142 is four data blocks each. When a first cache miss for data block B4 occurs in cache 140, data block B0 may be evicted from cache 140. Data block B4 may be retrieved from main memory 225 and stored in cache 142. When a second cache miss occurs for data block B5 in cache 140, data block B1 may be evicted from cache 140. Data block B5 may be retrieved from main memory 225 and stored in cache 142. When a third cache miss occurs for data block B6 in cache 140, data block B2 may be evicted from cache 140. Data block B6 may be retrieved from main memory 225 and stored in cache 142. When a fourth cache miss for data block B7 occurs in cache 140, data block B3 may be evicted from cache 140. Data block B7 may be retrieved from main memory 225 and stored in cache 142. After the fourth cache miss, the number of cache misses is equal to the cache capacity, and data blocks relating to thread 220 are now stored in cache 142. Thread 220 can now be executed by core 124 with access to data 222 in cache 142 and hardware controller 102 may now migrate thread 220 to core 124.

In examples where thread 220 experiences many cache misses, data 222 may be moved quickly from one cache to another. As threads will likely experience cache misses during execution, movement of data from cache 140 to cache 142 may be realized with little, or perhaps no, extra cost. In some examples, threads may be migrated before all blocks of data 222 are moved from one cache to another.

Figure 4:
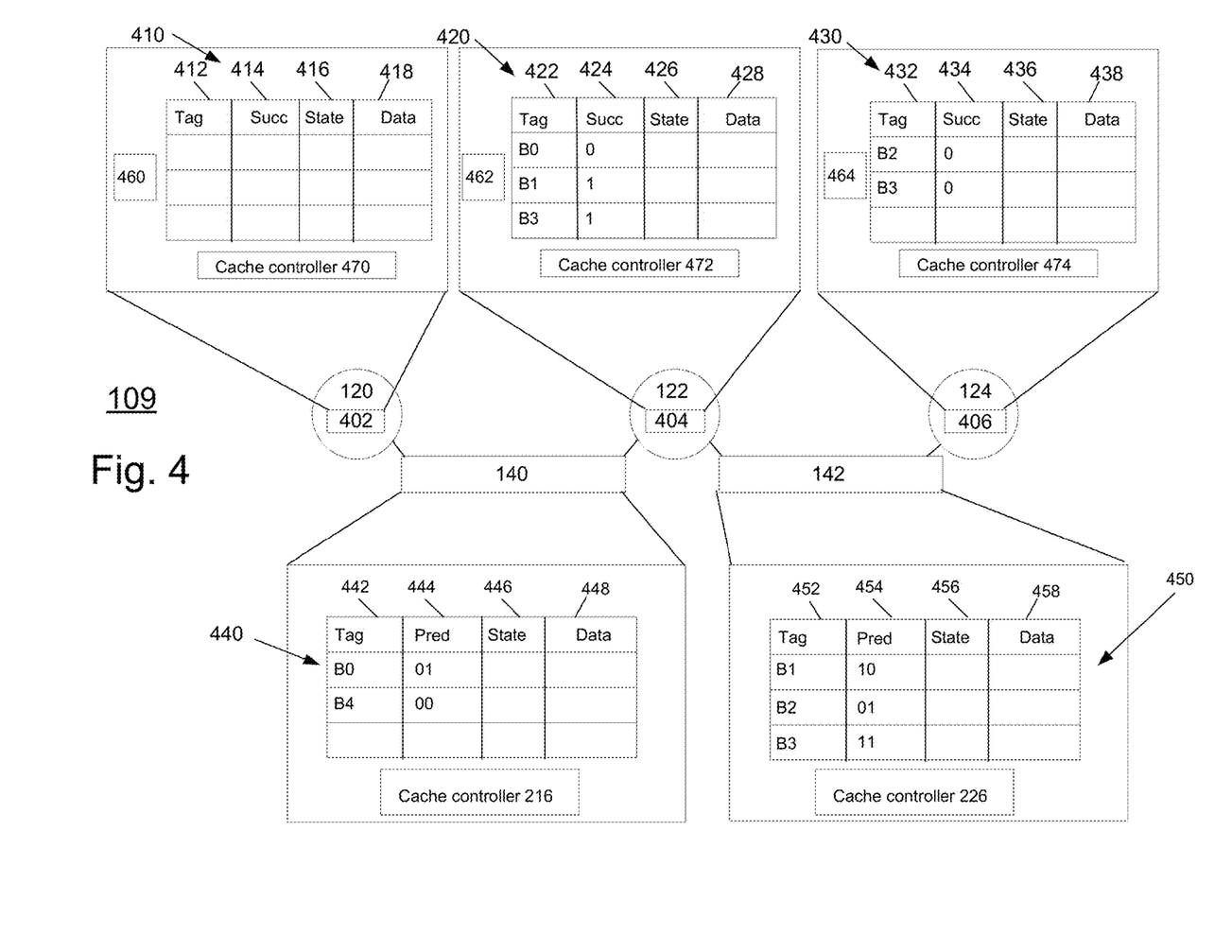
FIG. 4 illustrates an example die that may be used to implement shared cache data movement in thread migration.

FIG. 4 illustrates an example die that can be used to implement shared cache data movement in thread migration arranged in accordance with at least some embodiments described herein. Those components in FIG. 4 that are labeled identically to components of FIG. 1, FIG. 2, and FIG. 3 will not be described again for the purposes of clarity and brevity.

As mentioned above, core 120 may be configured in communication with cache 140 and may include cache 402. Core 122 may be configured in communication with caches 140 and 142 and may include cache 404. Core 124 may be configured in communication with cache 142 and may include cache 406. Caches 402, 404, 406 may be higher in a memory hierarchy than caches 140 and 142. For example, caches 402, 404, and/or 406 may be level 1 (L1) caches and caches 140 and 142 may be level 2 (L2) caches. Cache 402 may be configured in communication with cache 140. Cache 404 may be configured in communication with cache 140 and cache 142. Cache 406 may be configured in communication with cache 142. Caches 402, 404, and/or 406 may include cache controllers 470, 472, and/or 474, respectively.

L2 caches—140, 142—and L1 caches—402, 404, and/or 406—may be configured to operate in accordance with an inclusion property in examples when data blocks are modified or written by a processor core. Data written by core 120 to cache 402 may also be written to cache 140. Data written by core 122 to cache 404 may also be written to one of caches 140 or 142. Data written by core 124 to cache 406 may be written to cache 142. Thus, cache 140 may be a successor for cache 402 and cache 140 may also be a successor for cache 404. Cache 142 may be a successor for cache 404 and/or cache 406.

Similarly, in examples where cache controller 216 receives a request for a data block, cache controller 216 may check cache 140. If the requested data block is not present in cache 140, cache controller 216 knows that the requested data is also not present in cache 402 because of the inclusion property. Requests need not be sent to cache 402, thereby minimizing time in accessing cache 402. Thus, cache 402 may be a predecessor for cache 140. Cache 404 may be a predecessor for cache 140 and/or 142. Cache 406 may be a predecessor for cache 142.

In some examples, when a data block is evicted from a cache, the cache may send an invalidation message to higher level caches that may be predecessors. In other examples, cache 402 may store information in fields of a table 410. Table 410 may include a tag field 412, a successor ("Succ") field 414, a state field 416, a data field 418, and/or a successor predictor field 460. Table 410 may be implemented as two separate arrays: a tag array, including tag field 412, successor field 414, and state field 416; and a data array, including data field 418. The tag and data arrays may be fully associative, set associative, or direct mapped. Cache 404 may include a table 420. Table 420 may include a tag field 422, a successor field 424, a state field 426, a data field 428, and/or a successor predictor field 462. Cache 406 may include a table 430. Table 430 may include a tag field 432, a successor field 434, a state field 436, a data field 438, and/or a successor predictor field 464. Cache 404 and 406 may be organized into tag and data arrays as well.

Cache 140 may store information in fields of a table 440. Table 440 may include a tag field 442, a predecessor ("Pred") field 444, a state field 446, and/or a data field 448. Cache 142 may include a table 450. Table 450 may include a tag field 452, a predecessor field 454, a state field 456, and/or a data field 458.

In some examples, successor fields 414, 424, and/or 434 may store bits that distinguish the successors. For example, a bit value "0" may represent the left successor while a bit value "1" may represent the right successor. If there are more than two possible successors, more bits may be used. Data stored in successor fields may indicate a successor caches for the data block identified by the corresponding tag field. In the example in FIG. 4, cache 404 may have two successor caches—cache 140 and cache 142. Successor field 424 may be used to store an indication of a successor cache for a data block in cache 404. Each data block stored in cache may be associated with one successor cache. The association of the successor cache may be indicated in successor field 424 in table 420. For example, in table 420, data block B0 may be associated with the cache successor corresponding to identifier "0"—in the example, this may be cache 140. Data block B3 may be associated to the cache successor corresponding to identifier "1"—in this example, this may be cache 142.

Predecessor fields 444 and/or 454 may store data in a bit-vector representation. In the example shown in FIG. 4, cache 140 may have two predecessors, cache 402 and cache 404. Each data block may be associated with a respective predecessor cache. The association may be indicated by an indicator in the predecessor fields 444, 454 in tables 440, 450. For example, data block B0 may be stored in cache 140 and associated to cache 404 as a predecessor. The indication "01" may be stored in table 440 to indicate that cache 404 is the predecessor cache for data block B0. Data block B4 may be stored in cache 140 and the indication "00" may be stored as the predecessor for cache 140. In this example, indication "00" may indicate that data block B4 is stored in neither predecessor cache 402 nor 404. Similarly, an indication "10" (not shown) in predecessor field 444 may indicate that that the corresponding data block is stored in predecessor cache 402. An indication "11" (not shown) in predecessor field 444 may indicate that that the corresponding data block is stored in both predecessor caches 402 and 404. Although the example shows two predecessor caches, more than two predecessor caches may be used. Similarly, although a bit vector format is shown, other formats may be used such as actual cache identifiers.

In an example, core 122 may request to modify data block B0. Core 122 may first control cache controller 472 to write to data block B0 in cache 404. The writing to cache 404 may be propagated down to a successor cache if cache 404 uses a write through policy. Cache controller 472 may analyze successor field 424 in table 420 for data block B0. Cache controller 472 may determine that cache 140 is the successor for data block B0. Since "0" may be indicated for data block B0 in successor field 424, cache 140 is the successor of data block B0 in the example. Cache controller 472 may coordinate with cache controller 216 to write data block B0 to cache 140.

In an example, cache 142 may receive an invalidation request for data block B1. Cache controller 226 may analyze predecessor field 454 for data block B1 and determine that cache 404 is the predecessor cache for data block B1. Since "10" is indicated for data block B1 in predecessor field 454, cache controller 226 may send an invalidation message to cache 404 for data block B1.

In an example, cache 142 may receive an invalidation request for data block B3. Cache controller 226 may analyze the predecessor field 454 for data block B3 and determine that both processor caches 404 and 406 are indicated. Since "11" is indicated for data block B3 in predecessor field 454, cache controller 226 may send an invalidation message to both caches 404 and 406.

In examples when a thread is migrated from one core to another core in processor 108, predecessor and successor caches may be modified. For example, as data is moved, the indications of predecessor and successor caches may be updated to reflect the data movement.

In an example, when there is a cache miss in cache 404 for a data block, several policies may be used to determine which lower level cache in die 109 may be storing the data block. A first policy may be to simultaneously check all caches that may be successor caches for cache 404. For example, caches 140 and caches 142 may both be checked simultaneously when there is a cache miss in cache 404.

A second policy may be to sequentially check each cache that may be a successor for cache 404. In some examples, such sequential checking may be prioritized. Successor predictor field 460, 462, and/or 464 may be configured to store data predicting which lower level cache is likely to have the data block. For example, core 122 may keep track of a number of data blocks related to the thread that core 122 is currently executing that are stored in cache 140 and cache 142. The cache with the larger number of data blocks may have a greater chance of storing a current desired data block, and may be checked first. Successor predictor field 462 may store a count of data blocks in each successor cache and/or an indication of the successor cache with the greater number of data blocks stored.

A third policy may be to store a directory or history in cache 402. The directory or history may keep track of successor caches and specific data blocks stored in successor caches. Cache controllers 470, 472, 474 may analyze the directory or history to predict which lower level cache may be storing a requested data block. Successor predictor field 462 may be used to maintain the directory or history. In some examples, the directory or history may store addresses that were recently accessed.

Among other possible features, a system in accordance with the disclosure may provide for migration of threads among cores with limited or zero cost to move the data. Threads may be migrated without requiring another core to start processing a thread with an empty cache. Threads may be migrated to different cores to optimize performance, improve energy efficiency, resolve thermal hotspots, and/or for other reasons. The described system may be used to move data in shared caches. Movement of data from shared caches may represent a large cost in thread migration because shared caches may be large, for example, 256 KB to 1 MB. Decreasing cost of thread migration allows for hot spot management in that a hardware controller can move a thread from a hot core to a colder core. In heterogeneous multi-core processors, migration may also be used to have larger cores process a first set of instructions and then smaller cores process other sets of instructions. Shared caches may be maintained relatively small and close to related cores resulting in relatively fast access time.

Figure 5:
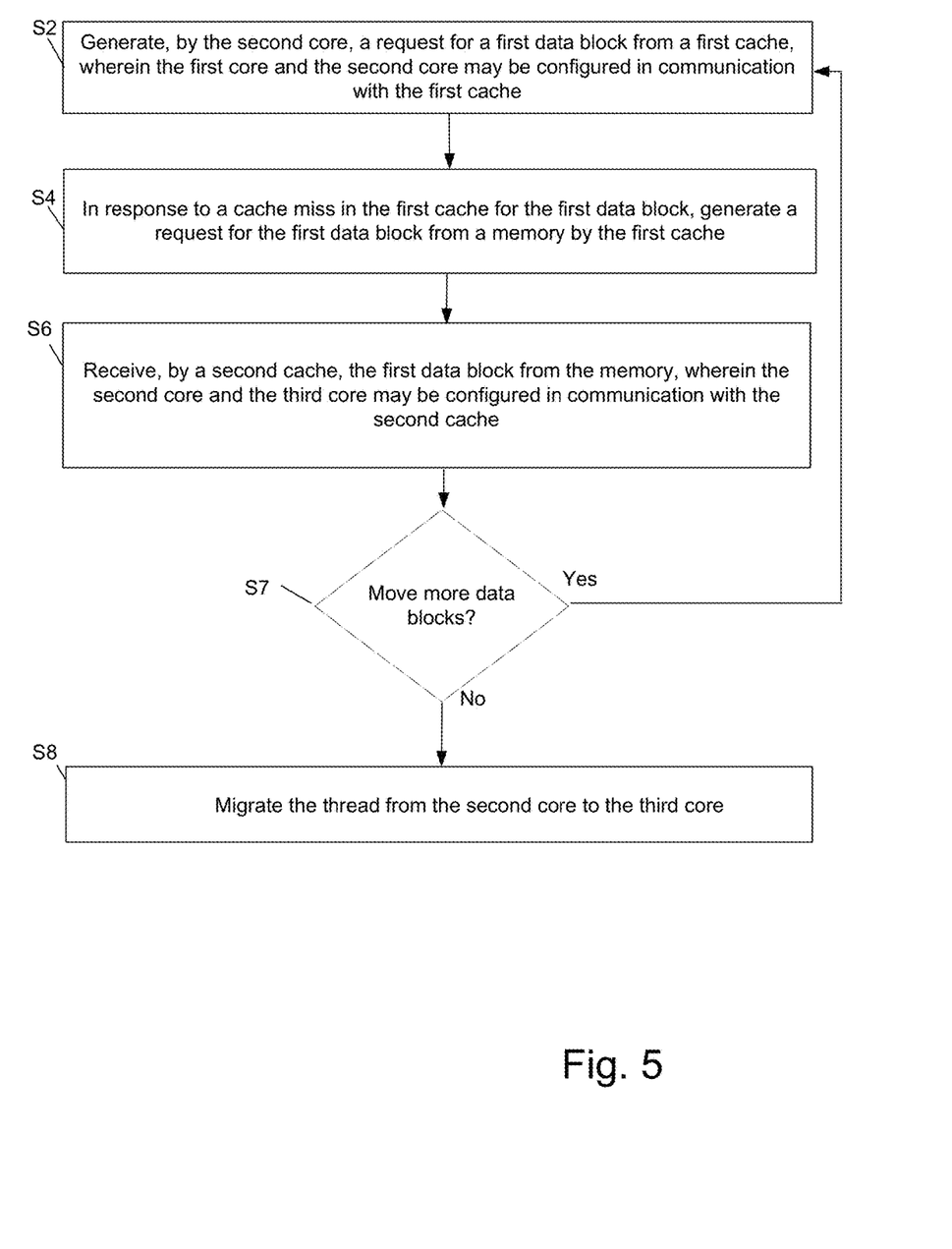
FIG. 5 depicts a flow diagram for an example process to implement shared cache data movement in thread migration.

FIG. 5 depicts a flow diagram for an example process for implementing shared cache data movement in thread migration arranged in accordance with at least some embodiments described herein. An example process may include one or more operations, actions, or functions as illustrated by one or more of blocks S2, S4, S6, and/or S8. The process may be used to migrate a thread in a multi-core processor that includes a first core, a second core, and a third core. Although illustrated as discrete blocks, various blocks may be divided into additional blocks, combined into fewer blocks, or eliminated, depending on the particular implementation.

Processing may begin at block S2, "Generate, by the second core, a request for a first data block from a first cache, wherein the first core and the second core may be configured in communication with the first cache." At block S2, in a multi-core processor, a second core may generate a request for a first data block from a first cache. The first and second core may be configured in communication with a first cache.

Processing may continue from block S2 to block S4, "In response to a cache miss in the first cache for the first data block, generate a request for the first data block from a memory by the first cache." At block S4, a cache miss may be experienced by the first cache. In response to the cache miss, the first cache may generate a request for the first data block from a memory. The request may further include an identifier of a second cache. The first cache may also evict a second data block from the first cache. The second core may update a first table to reflect the storage of the first data block. The first table may include an indication of the first data block and an indication of a successor cache associated with the first data block. The first cache may update a second table in the first cache to reflect the eviction. The second table may include an indication of the second data block and an indication of a predecessor cache associated with the second data block.

Subsequent requests to write a data block may be processed by analyzing the tables to determine successor caches. Invalidation messages received by a cache may be sent to a predecessor cache or multiple predecessor caches. Predictive data may be stored in one of the tables indicative of whether the first or the second cache is more likely to store a requested data block. The predictive data may be based on a number of data blocks stored in the first and second caches Processing may continue from block S4 to block S6 "Receive, by a second cache, the first data block from the memory, wherein the second core and a third core may be configured in communication with the second cache." At block S6, the second cache may receive the first data block from the memory. The second and third cores may be configured in communication with the second cache.

Processing may continue from block S6 to block S7, where a query may be made "Move more data blocks?" If the response to the query is "Yes" then processing may continue from block S7 to block S2. If the response to the query is "No" processing may continue from block S7 to block S8 "Migrate the thread from the second core to the third core." After receipt of the first data block by the second cache, an operating system may migrate the thread from the second core to the third core.

Figure 6:
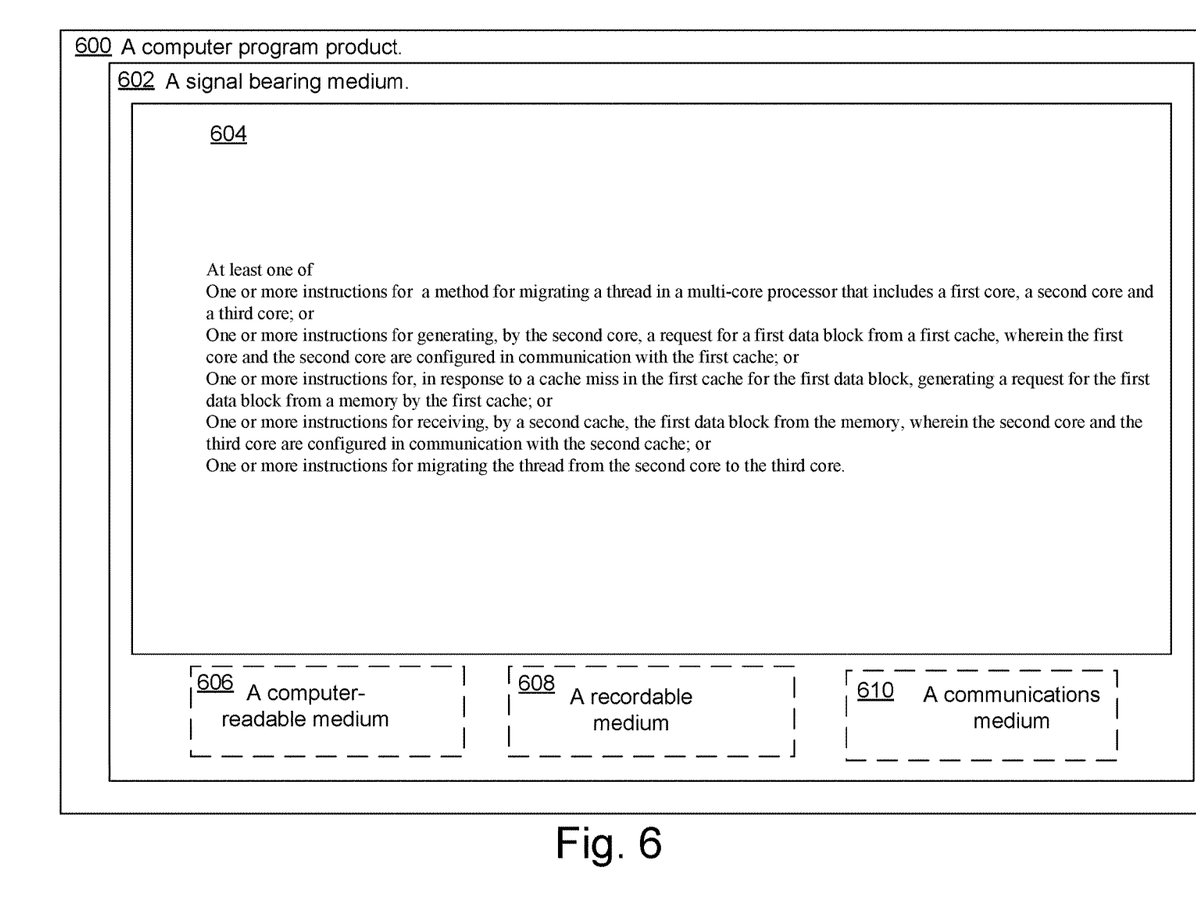
FIG. 6 illustrates a computer program product that can be utilized to implement shared cache data movement in thread migration.

FIG. 6 illustrates an example computer program product 600 that can be utilized to implement shared cache data movement in thread migration arranged in accordance with at least some embodiments described herein. Computer program product 600 may include a signal bearing medium 602. Signal bearing medium 602 may include one or more instructions 604 that, when executed by, for example, a processor, may provide the functionality described above with respect to FIGS. 1-5. Thus, for example, referring to system 100, one or more of hardware controller 102, and/or cores 120, 122 and/or 124 may undertake one or more of the blocks shown in FIG. 6 in response to instructions 604 conveyed to the system 100 by signal bearing medium 602.

In some implementations, signal bearing medium 602 may encompass a computer-readable medium 606, such as, but not limited to, a hard disk drive (HDD), a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.). Thus, for example, computer program product 600 may be conveyed to one or more modules of the system 100 by an RF signal bearing medium 602, where the signal bearing medium 602 is conveyed by a wireless communications medium 610 (e.g., a wireless communications medium conforming with the IEEE 802.11 standard).

Figure 7:
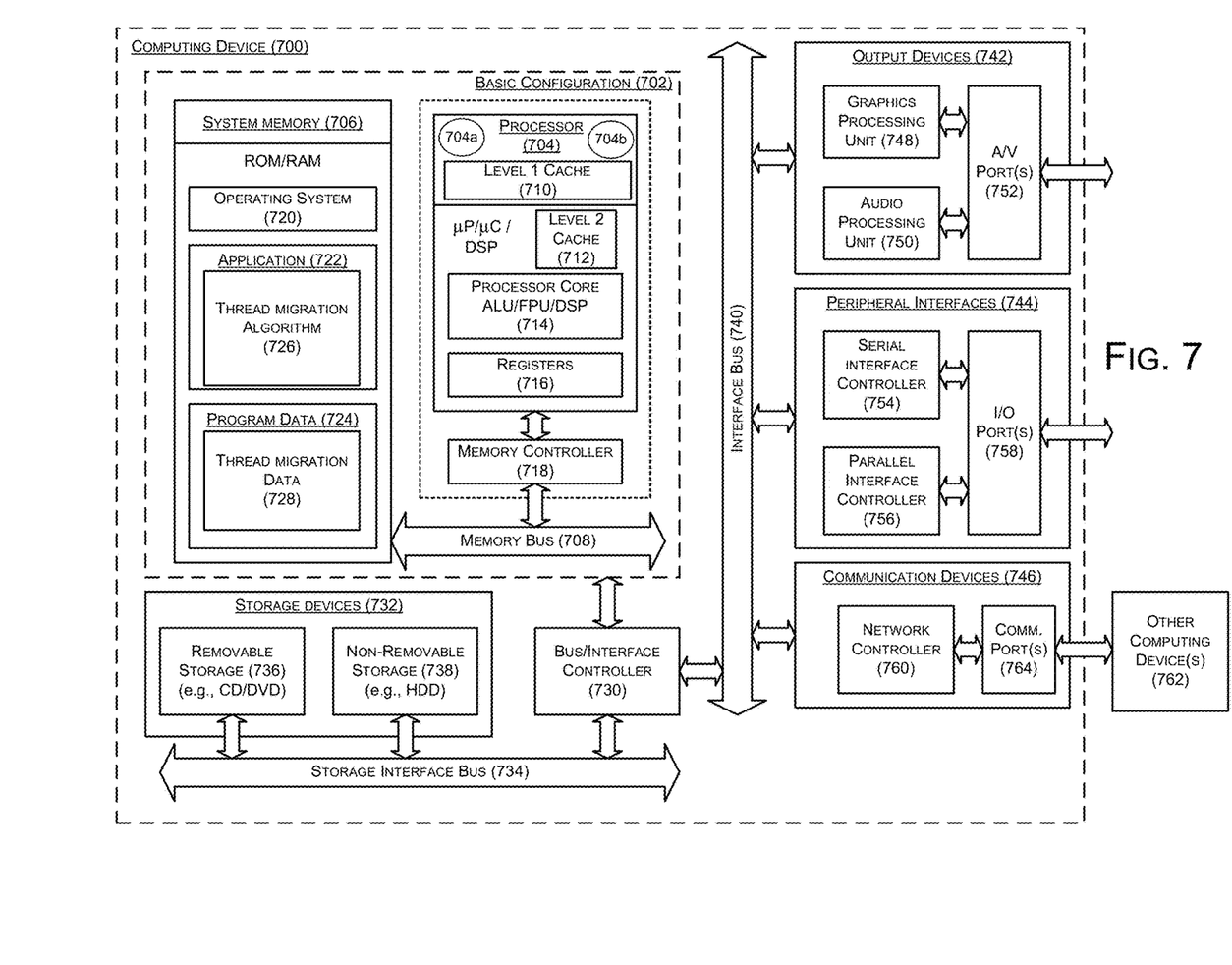
FIG. 7 is a block diagram illustrating an example computing device that is arranged to implement shared cache data movement in thread migration; all arranged according to at least some embodiments described herein.

FIG. 7 is a block diagram illustrating an example computing device 700 that is arranged to implement shared cache data movement in thread migration arranged in accordance with at least some embodiments described herein. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include two or more cores 704a, 704b. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a thread migration algorithm 726 that is arranged to perform the functions as described herein including those described with respect to system 100 of FIGS. 1-6. Program data 724 may include thread migration data 728 that may be useful to implement shared cache data movement in thread migration as is described herein. In some embodiments, application 722 may be arranged to operate with program data 724 on operating system 720 such that shared cache data movement in thread migration may be provided. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system configured to execute a thread, the system comprising:
    a first core, a second core, and a third core, wherein each of the cores is configured to execute the thread;
    a first cache configured to be in communication with the first core and the second core, wherein the first cache is further configured to provide storage of data; and
    a second cache configured to be in communication with the second core and the third core, wherein the second cache is further configured to provide storage of data, and wherein:
    the second core is further configured to generate a request for a data block from the first cache, wherein the data block includes a first data block, and
    in response to a cache miss in the first cache for the first data block, the first cache is further configured to:
        generate a request for the first data block from a memory, wherein the request includes an indicator that the first data block is to be stored in the second cache;
        evict a second data block from the first cache; and
        update a table in the first cache to reflect the eviction and to include an indication of a predecessor cache associated with the first data block.

2. A system configured to execute a thread, the system comprising:
    a first core, a second core, and a third core, wherein each of the cores is configured to execute the thread;
    a first cache configured to be in communication with the first core and the second core, wherein the first cache is further configured to provide storage of data; and
    a second cache configured to be in communication with the second core and the third core, wherein the second cache is further configured to provide storage of data, wherein the second core is further configured to generate a request for a data block from the first cache, and wherein:
    the data block includes a first data block,
    the second core includes a third cache,
    the third cache includes a table,
    in response to a cache miss in the first cache for the first data block, the first cache is further configured to:
        generate a request for the first data block from a memory, wherein the request includes an indicator that the first data block is to be stored in the second cache; and
        evict a second data block from the first cache,
    the second core is further configured to update the table in the third cache to reflect the storage of the first data block, and
    the table in the third cache includes:
        an indication of the first data block; and
        an indication of a successor cache associated with the first data block.

3. The system of claim 2, wherein:
    the second core is effective to, in response to the storage of the first data block and the eviction of the second data block, update the table in the third cache to reflect the storage of the first data block;

the first cache is further configured to update a table in the first cache to reflect the eviction of the second data block, and the table in the first cache includes:
an indication of the second data block; and
an indication of a predecessor cache associated with the second data block.

4. The system of claim 3, wherein the first core is further configured to:
receive a request to write a third data block to the first cache;
analyze the table in the third cache to determine a successor cache for the third data block; and
coordinate with the successor cache to write the third data block to the successor cache.

5. The system of claim 3, wherein the first cache is further configured to:
receive an invalidation message for a third data block;
analyze the table in the first cache to determine a predecessor cache for the third data block; and
send the invalidation message to the predecessor cache for the third data block.

6. The system of claim 3, wherein the second core is further configured to:
generate a request for a third data block;
determine that the third data block is not stored in the third cache; and
analyze the first cache and the second cache for the third data block.

7. The system of claim 3, wherein the second core is further configured to:
generate a request for a third data block;
determine that the third data block is not stored in the third cache;
analyze prediction data, wherein the prediction data is indicative of which of the first cache or the second cache is more likely to store the third data block, and wherein the prediction data is based on a number of data blocks stored in the first cache and the second cache; and
generate a request for the third data block based on the prediction data.

8. The system of claim 3, wherein the second core is further configured to:
generate a request for a third data block;
determine that the third data block is not stored in the third cache;
analyze prediction data, wherein the prediction data is based on a directory of data blocks stored in the first cache and the second cache; and
generate a request for the third data block based on the prediction data.

9. A system configured to execute a thread, the system comprising:
a first core, a second core, and a third core, wherein each of the cores is configured to execute the thread;
a first cache configured to be in communication with the first core and the second core, wherein the first cache is further configured to provide storage of data; and
a second cache configured to be in communication with the second core and the third core, wherein the second cache is further configured to provide storage of data, and wherein:
the second core is configured to generate a request for a data block from the first cache, and
in response to a cache miss in the first cache for the data block, the first cache is further configured to:
generate a request for the data block from a memory, wherein the request includes an indicator that the data block is to be stored in the second cache, wherein the indicator further indicates that a target core for the data block is the second core.

10. The system of claim 9, wherein:
the data block includes a first data block,
the second core includes a third cache,
the third cache includes a table,
the first cache is further configured to evict a second data block in from first cache,
the second core is further configured to update the table in the third cache to reflect the storage of the first data block, and
the table includes:
an indication of the first data block; and
an indication of a successor cache associated with the first data block.

11. A method to migrate a thread in a multi-core processor that includes a first core, a second core, and a third core, the method comprising:
generating, by the second core, a request for a data block from a first cache, wherein the first core and the second core are configured in communication with the first cache, wherein:
the data block includes a first data block,
the second core includes a third cache, and
the third cache includes a first table;
in response to a cache miss in the first cache for the first data block:
generating, by the first cache, a request for the first data block from a memory;
receiving, by a second cache, the first data block from the memory, wherein the second core and the third core are configured in communication with the second cache;
evicting a second data block in the first cache; and
updating the first table in the third cache to include an indication of the first data block and an indication of a successor cache associated with the first data block; and
migrating the thread from the second core to the third core.

12. The method of claim 11, further comprising, prior to generating the request for the first data block, migrating the thread from the first core to the second core.

13. The method of claim 11, wherein:
the first cache includes a second table, and
the method further comprises in response to the cache miss in the first cache for the first data block:
updating the second table in the first cache, wherein the second table includes an indication of the second data block and an indication of a predecessor cache associated with the second data block.

14. The method of claim 13, further comprising:
receiving a request to write a third data block to the first cache;
analyzing the first table to determine a successor cache for the third data block; and
coordinating with the successor cache to write the third data block to the successor cache.

15. The method of claim 13, further comprising:
receiving an invalidation message for a third data block;
analyzing the second table to determine at least one predecessor cache for the third data block; and
sending the invalidation message to the at least one predecessor cache for the third data block.

16. The method of claim 13, further comprising:
generating a request for a third data block;
determining that the third data block is not stored in the third cache; and
analyzing the first cache and the second cache for the third data block.

17. The method of claim 13, further comprising:
generating a request for a third data block;
determining that the third data block is not stored in the third cache; and
analyzing prediction data, wherein the prediction data is indicative of which of the first cache or the second cache is more likely to store the third data block, and wherein the prediction data is based on a number of data blocks stored in the first cache and the second cache; and
generating a request for the third data block based on the prediction data.

18. The method of claim 13, further comprising:
generating a request for a third data block;
determining that the third data block is not stored in the third cache; and
analyzing prediction data, wherein the prediction data is indicative of which of the first cache or the second cache is more likely to store a third data block, and wherein the prediction data is based on a directory of data blocks stored in the first cache and the second cache; and
generating a request for the third data block based on the prediction data.

19. A method to migrate a thread in a multi-core processor that includes a first core, a second core, and a third core, the method comprising:
generating, by the second core, a request for a data block from a first cache, wherein the first core and the second core are configured in communication with the first cache;
in response to a cache miss in the first cache for the data block, generating a request for the data block from a memory by the first cache;
receiving, by a second cache, the data block from the memory, wherein the second core and the third core are configured in communication with the second cache; and
migrating the thread from the second core to the third core, wherein the data block includes a first data block, and wherein the method further comprises in response to the cache miss in the first cache for the first data block:
evicting a second data block in the first cache; and
updating a table in the first cache to reflect the eviction and to update an indication of the second data block and an indication of a predecessor cache associated with the second data block.

20. The method of claim 19, wherein:
the table includes a first table,
the second core includes a third cache,
the third cache includes a second table, and
the method further comprises, in response to the cache miss in the first cache for the first data block, updating the second table in the third cache to include an indication of the first data block and an indication of a successor cache associated with the first data block.

* * * * *

UNITED STATES PATENT AND TRADEMARK OFFICE
CERTIFICATE OF CORRECTION

PATENT NO.        : 9,710,303 B2
APPLICATION NO.   : 14/009750
DATED             : July 18, 2017
INVENTOR(S)       : Solihin Page 1 of 1

It is certified that error appears in the above-identified patent and that said Letters Patent is hereby corrected as shown below:

On the Title Page

In Item (71), under "Applicant", in Column 1, Line 1-3, delete "EMPIRE TECHNOLOGY DEVELOPMENT, LLC, Wilmington, DE (US)" and insert -- EMPIRE TECHNOLOGY DEVELOPMENT LLC, Wilmington, DE (US) --, therefor.

In Item (74), under "Attorney, Agent, or Firm", in Column 2, Line 1, delete "Moritt Hock & Hamroff;" and insert -- Moritt Hock & Hamroff LLP --, therefor.

In the Specification

In Column 13, Line 23, delete "general such" and insert -- general, such --, therefor.

In Column 13, Line 30, delete "general such" and insert -- general, such --, therefor.

In the Claims

In Column 14, Line 67, in Claim 3, delete "block;" and insert -- block, --, therefor.

In Column 16, Line 11, in Claim 10, delete "block in from first" and insert -- block from the first --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*